United States Patent [19]

Grayson

[11] 4,081,363
[45] Mar. 28, 1978

[54] MINERAL BENEFICIATION BY FROTH FLOTATION: USE OF ALCOHOL ETHOXYLATE PARTIAL ESTERS OF POLYCARBOXYLIC ACIDS

[75] Inventor: Martin Grayson, Cos Cob, Conn.

[73] Assignee: American Cyanamid Company, Stamford, Conn.

[21] Appl. No.: 582,040

[22] Filed: May 29, 1975

[51] Int. Cl.² .............................................. B03D 1/02
[52] U.S. Cl. .................................................... 209/166
[58] Field of Search .............................. 209/166, 167; 260/485 G; 560/91, 182, 198

[56] References Cited

U.S. PATENT DOCUMENTS

| | | | |
|---|---|---|---|
| 2,025,984 | 12/1935 | Harris | 260/404.8 |
| 2,099,120 | 11/1937 | Kirby | 209/166 |
| 2,120,217 | 6/1938 | Harris | 209/166 |
| 2,302,338 | 11/1942 | Mueller | 209/166 |
| 2,302,432 | 11/1944 | Cahn | 209/166 |
| 2,312,466 | 3/1943 | Erickson | 209/166 |
| 2,679,522 | 5/1954 | De Groote | 260/485 G X |
| 2,950,818 | 8/1960 | Moeller | 209/166 |
| 3,779,380 | 12/1973 | Bishop | 209/166 |
| 3,902,602 | 9/1975 | Retrovich | 209/166 |
| 3,909,359 | 9/1975 | Retrovich | 209/166 |

FOREIGN PATENT DOCUMENTS 1,355,091  5/1974  United Kingdom ................ 209/166

*Primary Examiner*—Robert Halper
*Attorney, Agent, or Firm*—William J. van Loo

[57] ABSTRACT

Improved recovery of non-sulfide minerals is provided in froth flotation by use of alcohol ethoxylate partial esters of polycarboxylic acids as collectors.

10 Claims, No Drawings

MINERAL BENEFICIATION BY FROTH FLOTATION: USE OF ALCOHOL ETHOXYLATE PARTIAL ESTERS OF POLYCARBOXYLIC ACIDS

This invention relates to an improved process of mineral beneficiation by froth flotation. More particularly, the invention relates to such a process wherein non-sulfide minerals such as phosphate, fluorite and barite are processed by froth flotation using as collector one of certain partial esters of polycarboxylic acids.

Froth flotation is the principal means of concentration phosphate, barite, and fluorite ores as well as a host of other ores. Its chief advantage is that it is a relatively efficient operation at a substantially lower cost than many other processes.

Flotation is a process for separating finely ground valuable minerals from their associated gangue, or waste, or for separating valuable components one from the other. In froth flotation, frothing occurs by introducing air into a pulp of finely divided ore and water containing a frothing agent. Minerals that have a special affinity for air bubbles rise to the surface in the froth and are separated from those wetted by the water. The particles to be separated by froth flotation must be of a size that can be readily levitated by the air bubbles.

Agents called collectors are used in conjunction with flotation to promote recovery of the desired material. The agents chosen must be capable of selectively coating the desired material in spite of the presence of many other mineral species. Current theory states that the flotation separation of one mineral species from another depends on the relative wettability of surfaces. Typically, the surface free energy is purportedly lowered by the adsorption of heteropolar surface-active agents. The hydrophobic coating thus provided acts in this explanation as a bridge so that the particle may be attached to an air bubble. The practice of this invention is not limited by this or other theories of flotation.

Typically, phosphate ore containing about 30% BPL (bone phosphate of lime) $Ca_3(PO_4)_2$, is concentrated in very large tonnages from the Florida pebble phosphate deposits. The ore slurry from strip mining is sized at about 1 millimeter and the coarser fraction, after scrubbing to break up mud balls, is a finished product. The minus 1 mm fraction is further sized at 35 and 150 mesh. The minus 150 mesh slime is discarded. From the sizing operation the +35 mesh material in thick slurry is treated with fatty acid, fuel oil, and caustic ammonia or other alkaline material and the resulting agglomerates are separated on shaking tables, spirals, or spray belts. The 35 × 150 mesh fraction is conditioned with the same type of reagents and floated by conventional froth flotation route. Not all the silica gangue is rejected by the fatty acid flotation, so the concentrate is blunged with acid to remove collector coatings, deslimed, washed of reagents and subjected to an amine flotation with fuel oil at pH 7-8. This latter flotation sometimes called "cleaning" removes additional silica and raises the final concentrate grade to 75-80% BPL.

Although the procedure described above is effective in the recovery of BPL from phosphate rock, there nevertheless exists the need for more effective collectors which will provide increased recovery of phosphorus values while still providing high grade recovery. In view of the high quantities of phosphate rock processed by froth flotation, such a development can result in a substantial increase in the total amount of phosphorus values recovered and provide substantial economic advantages even when a modest increase in recovery is provided. Accordingly, the provision for an improved process for froth flotation of non-sulfide minerals would fulfill a long-felt need and constitute a notable advance in the art.

In accordance with the present invention, there is provided a process for recovering non-sulfide minerals which comprises classifying the mineral to provide particles of flotation size, slurrying the sized mineral in aqueous medium, conditioning the slurry with effective amounts of fuel oil, alkali, and a partial ester of a polycarboxylic acid having at least one free carboxylic acid group, and floating the desired mineral values by froth flotation, said partial ester having the structure

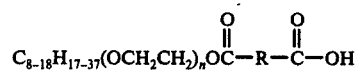

wherein n is an integer of 1-10 and R is a bivalent grouping selected from $-(CH_2)_m-$ wherein $m$ is an integer of 1-6,

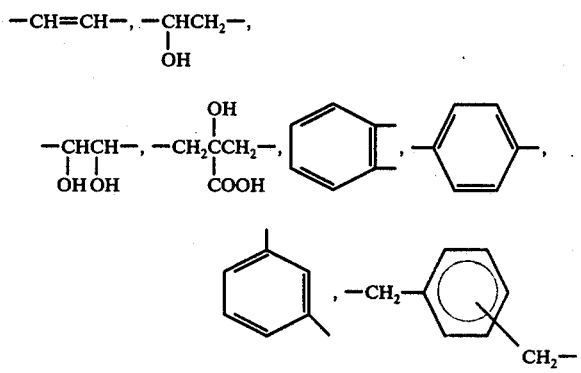

o, p, and m- and $-C_6H_{10}$.

Use of the specified acids provides unexpected improvements in recovery of valuable minerals at high grade, or purity, levels under normal froth flotation conditions. These acids are readily degraded to permit recycle of process streams. The present acids are readily dispersed in aqueous systems providing efficient coverage of the mineral surface. The acids are stable for practical periods under froth flotation conditions. The acids resist deposition and inactivation by normal or excessive water hardness ions such as soluble calcium and magnesium compounds (carbonates, bicarbonates, hydroxides, etc.).

The acids used in the present process are provided by synthesis utilizing specific polycarboxylic acids and esterifying agents. These synthetic acids are moderate in cost, provide greater recovery of usable mineral per unit cost, and are more readily available than currently used reagents. The synthetic acids can be produced in more consistent, predictable purity and quality then naturally derived, scarce products. The acids of the present process will release scarce edible oil stocks for nutritional purposes.

In carrying out the process of the present invention, a non-sulfide mineral is selected for treatment. Such minerals include phosphate, fluorite, barite, and the like that are conventionally processed by froth flotation. The selected mineral is screened to provide particles of flotation size according to conventional procedures. Generally, the flotation size will encompass from about 35 × 150 mesh size.

After the selected mineral has been sized as indicated, it is slurried in aqueous medium and conditioned with acid, fuel oil and alkali in effective amounts in accordance with conventional procedures. Generally, the slurry is conditioned at pasty consistency in the range of about 50 to 75% solids, preferably about 65-70% solids. Generally, the acid and fuel oil is used as a mixture in the ratio from about 2/1 to ¼ acid/oil such as to provide a level of about 0.1 to 1.0 lbs. of acid per ton of mineral, although variations in amounts will vary with the specific mineral being processed within conventional ranges. The fuel oil is used to suppress froth formation and will vary as necessary depending on the extent to which excessive frothing occurs.

Alkali usage will be within conventional limits and is that necessary to provide the pH value at which froth flotation is to be accomplished. The pH value is generally on the alkaline side but specific values will vary depending upon the mineral processed and the combination of recovery and grade desired. Generally the pH will range from about 6.0 to 12.0, usually 8.0 to 10.0.

As the acid used in accordance with the present invention, there is employed one having the general structure $$C_{8-18}H_{17-37}(OCH_2CH_2)_nOC-R-C-OH$$
$$\quad\quad\quad\quad\quad\quad\quad\quad\quad\parallel\quad\;\;\parallel$$
$$\quad\quad\quad\quad\quad\quad\quad\quad\quad O\quad\;\; O$$

wherein $n$ is an integer of 1-10 and R is a bivalent grouping selected from $-(CH_2)_m-$, wherein $m$ is an integer of 1-6; $-CH=CH-$;

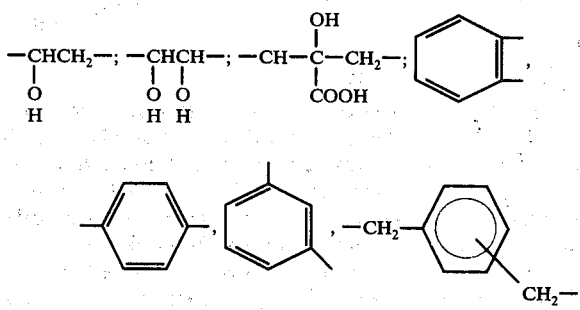

o, p, and m- and $-C_6H_{10}$.

Typically, the useful acids are partial esters of alcohol ethoxylates of the general structure $$C_yH_{2y+1}(OCH_2CH_2)_nOH$$

wherein $y$ is an integer of 8 to 18 and $n$ is as defined above and di- or tribasic acids such as malic, maleic, citric, tartaric, succinic, adipic, phthalic, cyclohexyl dicarboxylic, terephthalic, and similar acids. Preferably the polycarboxylic acid used in forming the partial ester is maleic acid. Preferably the alcohol ethoxylate is such that $y$ is 12-14 and $n$ is 3. Suitable partial esters include those of the following structures:

$$C_{12-14}H_{25-29}(OCH_2CH_2)_3OC-CH=CH-COOH;$$

-continued

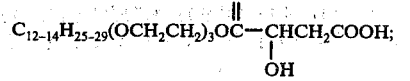

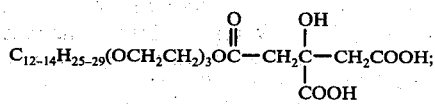

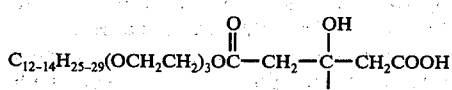

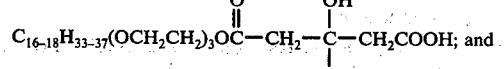

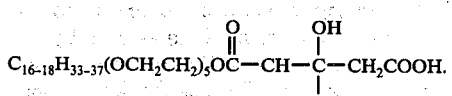

Suitable non-sulfide minerals processed by the process of the present invention include fluorite or fluorspar, barite or barytes, phosphate rock of the pebble type as found in Florida or foskorite as found in South Africa. Other nonsulfide minerals that are process by froth flotation using an acid collector may also be processed.

The invention is more fully illustrated by the examples which follow, wherein all parts and percentages are by weight unless otherwise specified. Although the invention is illustrated with phosphate minerals, it is to be understood that similar benefits are obtainable with other minerals as defined. The following general procedure is employed in the froth flotation examples given.

GENERAL PROCEDURE

Rougher Float

Step 1: Secure washed and sized feed, e.g., 35 × 150 mesh screen fractions. Typical feed is usually a mixture of 23% coarse with 77% fine flotation particles.

Step 2: Sufficient wet sample, usually 640 grams, to give a dry weight equivalent of 500 grams. The sample is washed once with about an equal amount of tap water. The water is carefully decanted to avoid loss of solids.

Step 3: The moist sample is conditioned for one minute with approximately 100 cc of water, sufficient caustic as 5-10% aqueous solution to obtain the pH desired, a mixture of 50% acid and suitable fuel oil and additional fuel oil as necessary. Additional water may be necessary to give the mixture the consistency of "oatmeal" (about 69% solids). The amount of caustic will vary 4 to about 20 drops. This is adjusted with a pH meter for the correct end point. At the end of the conditioning, additional caustic may be added to adjust the end point. However, an additonal 15 seconds of conditioning is required if additional caustic is added to adjust the pH. Five to about 200 drops of acid-oil mixture and one-half this amount of additional oil is used, depending on the treatment level desired.

Step 4: Conditioned pulp is placed in an 800-gram bowl of a flotation machine and approximately 2.6 iters of water are added (enough water to bring the pulp level to lip of the container). The percent solids in the cell is then about 14%. The pulp is floated for 2 minutes with air introduced after 10 seconds of mixing.

De-oiling

Step 5: The excess water is carefully decanted from the rougher products. The tails are set aside for drying and analysis. The concentrate is placed back in the flotation machine with 10 cc. of 10% sulfuric acid and about 2.0 liters of water. The mixture is agitated 3 minutes in the absence of air feeding to remove the flotation oil. The contents of the cell are removed to a plastic pan, the excess water is decanted, and the rougher concentrate is washed twice using tap water with careful decantation of the excess water.

Cleaner (Silica) Flotation

Step 6: Rougher concentrate is placed in the bowl of the flotation machine and sufficient water is added to bring the pulp level to approximately 0.5 inch below the lip. Amine, kerosene, and frother are introduced and the pulp is agitated until all sand froth disappears. Usually 3 drops of kerosene, 1 drop of frother, and from 1 to 2 cc. of 2% amine solution are required for an acceptable float.

Step 7: The products are oven dried, weighed, and analyzed for weight percent $P_2O_5$ or BPL. The cleaner tails are combined with the rougher tails for assay. Steps 5 and 6 may be omitted if it is desired to obtain rougher concentrate recovery only. Additional analyses for CaO, MgO, $Fe_2O_3$ and $Al_2O_3$ are sometimes required but are not necessary to determine rougher concentrate recovery. Recovery of mineral values is calculated using the formula:

$$\frac{(Wc)(Pc)}{(Wc)(Pc) + (W_t)(P_t)} \times 100$$

wherein Wc and $W_t$ are the dry weights of concentrate and tailings, respectively, and Pc and $P_t$ are the weight percent $P_2O_5$ of the concentrate and tails, respectively. Recovery values for rougher concentrate are calculated in the same way whether or not steps 5 and 6 are performed.

EXAMPLE 1

Flotation of Florida Phosphate

Using as collector a half ester of the following structure

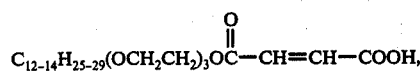

Florida phosphate rock was processed according to the General Procedure described above omitting steps 5 and 6. The half ester results from use of mixed alcohols used to obtain the ethoxylated alcohol and thus has variable carbon content. The collector was used at 0.1 lb. per ton of ore in conjunction with 1.5 lbs. of No. 5 fuel oil per ton of ore to control froth formation. Caustic usage was that necessary to provide a pH value of 9.55. Results are given in Table I.

For comparison purposes, a similar run was made using a conventional fatty acid, oleic acid, at the same usage level. Similar use levels of fuel oil and caustic were also employed. Results are also shown in Table I.

It can be seen from Table I that a collector of the present invention provides significant recovery of phosphate values whereas the conventional fatty acid is completely ineffective at this usage level.

EXAMPLE 2

The procedure of Example 1 was repeated except that the collector was used at a level of 0.25 lb. per ton and oil usage was at 1.75 lb. per ton. The pH value also varied slightly.

For comparison purposes, a similar run was made using the conventional fatty acid as before except that the usage levels of acid and oil were as in Example 2.

Results of Example 2 and the comparative run are also shown in Table I.

It can be seen from Table I that a collector of the present invention provides significantly greater recovery than the prior art collector at substantially equivalent grade.

EXAMPLE 3

The procedure of Example 1 was again followed except that the collector was used at a level of 0.50 lb. per ton and oil usage was 1.50 lbs. per ton. Caustic usage was such as to provide pH of 8.2.

For comparison purposes, a similar run was made using the conventional fatty acid as before except that the usage levels of acid, oil, and caustic were as in Example 3.

Results of Example 3 and the comparative run are also shown in Table I.

It can be seen from Table I that a collector of the present invention provides significantly greater recovery than the prior art collector at substantially equivalent grade.

EXAMPLE 4

The procedure of Example 3 was repeated except that caustic usage was increased to provide a pH value of 9.55.

For comparison purposes, a similar run was made using the conventional fatty acid as before except that usage levels of acid, oil, and caustic were as in Example 4.

Results of Example 4 and the comparative run are also shown in Table I.

It can be seen from Table I that a collector of the present invention provides greater recovery than the prior art collector at substantially equal grade.

TABLE I

| | Flotation of Floride Phosphate | | | |
|---|---|---|---|---|
| Example | Use Level (lb./ton) acid/oil | pH | Rougher Recovery (%) | Grade (% $P_2O_5$) |
| 1 | 0.10/1.50 | 9.55 | 59.54 | 31.32 |
| Comparative | 0.10/1.50 | 9.8 | 0.0 | — |
| 2 | 0.25/1.75 | 9.50 | 84.12 | 29.28 |
| Comparative | 0.25/1.75 | 9.35 | 74.48 | 28.17 |
| 3 | 0.50/1.50 | 8.5 | 92.00 | 28.33 |
| Comparative | 0.50/1.50 | 8.2 | 84.67 | 30.11 |
| 4 | 0.50/1.50 | 9.55 | 93.33 | 27.88 |
| Comparative | 0.50/1.50 | 9.45 | 86.86 | 29.16 |

EXAMPLE 5

The procedure of Example 1 was followed except that the collector employed was of the following structure:

$$C_{12-14}H_{25-29}(OCH_2CH_2)_3O\overset{O}{\overset{\|}{C}}-\underset{OH}{\overset{|}{C}}-CH_2COOH.$$

It was used at 0.5 lb. per ton of ore with 1.50 lbs. of No. 5 fuel oil per ton of ore. Caustic usage was sufficient to provide a pH value of 11.55.

For comparison purposes, a similar run was made except that a conventional collector, oleic acid, was substituted for the half acid used in Example 5. Results of both runs are shown in Table II.

EXAMPLE 6

The procedure of Example 5 was repeated except that a collector of the following structure was substituted for the collector of Example 5:

$$C_{12-14}H_{25-29}(OCH_2CH_2)_3O\overset{O}{\overset{\|}{C}}-CH_2-\underset{COOH}{\overset{OH}{\overset{|}{C}}}-CH_2-COOH.$$

For comparison purposes, the same control as in Example 5 was employed. Results are shown in Table II.

TABLE II

| | Flotation of Floride Phosphate | | | |
|---|---|---|---|---|
| Example | Use Level (lb./ton) Acid/oil | pH | Rougher Recovery (%) | Grade (% $P_2O_5$) |
| 5 | 0.50/1.50 | 11.55 | 79.07 | 25.90 |
| 6 | 0.50/1.50 | 11.5 | 66.55 | 21.50 |
| Comparative | 0.50/1.50 | 11.45 | 56.30 | 30.56 |

It can be seen from Table II that a collector of the present invention provides better recovery at the pH value indicated than a conventional collector. Although the grade of the rougher concentrate is reduced, upon cleaner flotation a greater recovery of $P_2O_5$ will result.

Comparative Example A

The procedure of Example 3 was followed except that a collector of the following structure was employed:

$$C_{12-14}H_{25-29}O\overset{O}{\overset{\|}{C}}-CH=CH-COOH.$$

Rougher recovery was 64.30% and grade was 29.09% $P_2O_5$. The corresponding values obtained in Example 3 were 92.00% and 28.33% $P_2O_5$, indicating the superiority in performance of a collector of the present invention.

EXAMPLE 7

Flotation of Foskorite (South Africa)

The procedure of Example 5 was followed except that the ore processed was foskorite, a hard rock phosphate mineral from South Africa, and the use level of collector was 0.8 lb. per ton and of oil (No. 6 fuel oil) was 0.8 lb. per ton. Recovery was 79.03% and the % $P_2O_5$ in the rougher concentrate was 15.95. These results indicate that good processing of hard rock phosphate ores is also achieved with a collector of the present invention.

EXAMPLE 8

Fluorspar Ore

Following conventional procedure, a fluorspar ore was froth floated using 0.30 lb. per ton of ore of a collector of the structure given in Example 6. No. 5 fuel oil was used in the amount of 0.30 lb./ton. Rougher recovery was 98.21% at a grade of 84.00% $CaF_2$.

For comparison purposes, a similar run was made using oleic acid at the same use level but without fuel oil. Rougher recovery was 75.86% at a grade of 91.24% $CaF_2$.

The results show the improved recovery obtained using a collector of the present invention in the froth flotation of fluorite ore.

I claim:

1. A process for recovering non-sulfide minerals which comprises classifying the mineral to provide particles of flotation size, slurrying the sized mineral in aqueous medium, conditioning the slurry with effective amounts of fuel oil, alkali, and a partial ester of a polycarboxylic acid having at least one free carboxylic acid group, and floating the desired mineral values by froth flotation, said partial ester having the structure.

$$C_{8-18}H_{17-37}(OCH_2CH_2)_nO\overset{O}{\overset{\|}{C}}-R-COOH$$

wherein n is an integer of 1–10 and R is a bivalent grouping selected from $-CH_2-_m$ wherein m is an integer of 1 to 6.

$$-CH=CH-,\ -\underset{OH}{\overset{|}{C}HCH_2}-,\ -\underset{OH}{\overset{|}{C}H}\underset{OH}{\overset{|}{C}H}-,\ -CH_2\underset{COOH}{\overset{OH}{\overset{|}{\underset{|}{C}}}}-CH_2-,$$

[benzene ring structures], -CH₂-, [substituted ring structures]

o, p, and m- and $-C_6H_{10}$.

2. The process of claim 1 wherein the partial ester has the structure $$C_{12-14}H_{25-29}(OCH_2CH_2)_3O\overset{O}{\overset{\|}{C}}-CH=CH-COOH.$$

3. The process of claim 1 wherein the partial ester has the structure $$C_{12-14}H_{25-29}(OCH_2CH_2)_3O\overset{O}{\overset{\|}{C}}-\underset{OH}{\overset{|}{C}HCH_2COOH}.$$

4. The process of claim 3 wherein said non-sulfide mineral is foskorite.

5. The process of claim 1 wherein the partial ester has the structure

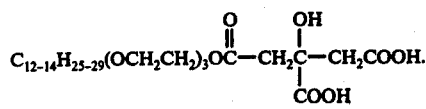

6. The process of claim 5 wherein said non-sulfide mineral is fluorspar.

7. A process for recovering phosphate rock minerals which comprises classifying the mineral to provide particles of flotation size, slurrying the sized mineral in aqueous medium, conditioning the slurry with effective amounts of fuel oil, alkali, and a partial ester of a polycarboxylic acid having at least one free carboxylic acid group, and floating the desired mineral values by froth flotation, said partial ester having the structure

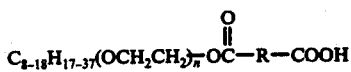

wherein $n$ is an integer of 1–10 and R is a bivalent grouping selected from $-(CH_2)_m-$ wherein $m$ is an integer of 1 to 6,

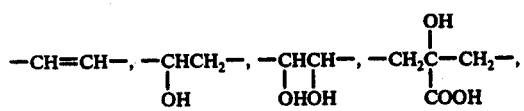

-continued

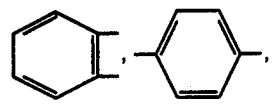

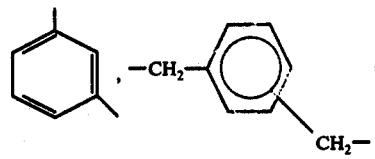

o, p, and m- and $-C_6H_{10}-$.

8. The process of claim 7 wherein the partial ester has the structure

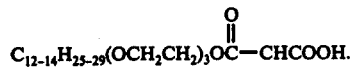

9. The process of claim 7 wherein the partial ester has the structure

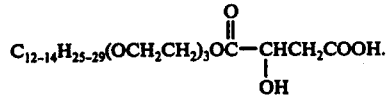

10. The process of claim 7 wherein the partial ester has the structure

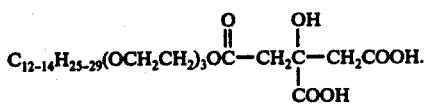

* * * * *